(12) United States Patent
Zielinski et al.

(10) Patent No.: US 12,555,125 B2
(45) Date of Patent: Feb. 17, 2026

(54) EMISSION DETECTING CAMERA PLACEMENT PLANNING USING 3D MODELS

(71) Applicant: Schlumberger Technology Corporation, Sugar Land, TX (US)

(72) Inventors: Lukasz Zielinski, Arlington, MA (US); Manasi Doshi, Cambridge, MA (US); Christopher Boucher, Cambridge, MA (US); Andrew J. Speck, Milton, MA (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 18/737,698

(22) Filed: Jun. 7, 2024

(65) Prior Publication Data

US 2025/0014048 A1    Jan. 9, 2025

Related U.S. Application Data (60) Provisional application No. 63/507,342, filed on Jun. 9, 2023.

(51) Int. Cl.
*G06Q 30/018* (2023.01)
*G01N 21/88* (2006.01)

(52) U.S. Cl.
CPC ....... *G06Q 30/018* (2013.01); *G01N 21/8851* (2013.01)

(58) Field of Classification Search
CPC ...... G01D 21/00; G06Q 50/26; G06Q 10/063; G06Q 50/06; G06Q 50/02; G06Q 10/06;
(Continued)

(56) References Cited

U.S. PATENT DOCUMENTS

| 5,375,465 A | 12/1994 | Carlson |
| 11,525,764 B2 | 12/2022 | Bryning |

(Continued)

FOREIGN PATENT DOCUMENTS

| CN | 105067023 A | 11/2015 |
| CN | 107608009 A | 1/2018 |

(Continued)

OTHER PUBLICATIONS

Montazeri A, Zhou X, Albertson JD. On the Viability of Video Imaging in Leak Rate Quantification: A Theoretical Error Analysis. Sensors (Basel). Aug. 24, 2021;21(17):5683. doi: 10.3390/s21175683. PMID: 34502574; PMCID: PMC8434307 (Year: 2021).*

(Continued)

*Primary Examiner* — Michael P Harrington
(74) *Attorney, Agent, or Firm* — Kyle R. Miiller (57) ABSTRACT

Process for locating emission detecting camera(s) at a worksite. The process can include creating a site model, completing a camera coverage calculation loop that can include choosing a first camera location from the site model, and completing a source calculation loop to provide a plurality of coverage values of the first camera location for a plurality of potential emission sources in the site model. The process can also include calculating a coverage ratio from the plurality of coverage values to provide a first coverage ratio. The process can also include repeating the camera coverage calculation loop for an additional potential camera location from the site model to provide a plurality of coverage ratios. The process can also include creating an ordered list of the potential camera locations based on the coverage ratios. The process can also include choosing a camera position at the worksite from the ordered list.

18 Claims, 8 Drawing Sheets

(58) Field of Classification Search
CPC ... G06Q 30/018; G01N 21/8851; G01S 17/88
See application file for complete search history.

(56) References Cited

U.S. PATENT DOCUMENTS

| | | | |
|---|---|---|---|
| 11,630,022 | B2 | 4/2023 | Hedberg |
| 2012/0265479 | A1 | 10/2012 | Bridges |
| 2014/0067919 | A1 | 3/2014 | Tada |
| 2014/0088442 | A1* | 3/2014 | Soykan ............... A61B 5/6866 600/483 |
| 2014/0300886 | A1 | 10/2014 | Zogg |
| 2015/0103178 | A1 | 4/2015 | Itoh |
| 2015/0172545 | A1 | 6/2015 | Szabo |
| 2015/0213697 | A1 | 7/2015 | Knox |
| 2015/0369730 | A1 | 12/2015 | Schmidt |
| 2016/0146696 | A1 | 5/2016 | Steele |
| 2017/0024642 | A1 | 1/2017 | Xiong |
| 2017/0364818 | A1 | 12/2017 | Wu |
| 2018/0039885 | A1 | 2/2018 | Albrecht |
| 2018/0218095 | A1* | 8/2018 | Basu .................... G06Q 50/26 |
| 2018/0292286 | A1 | 10/2018 | Dittberner |
| 2018/0365522 | A1 | 12/2018 | Jiang |
| 2019/0068879 | A1 | 2/2019 | Bao |
| 2019/0196892 | A1 | 6/2019 | Matei |
| 2019/0285504 | A1 | 9/2019 | Muralidhar |
| 2019/0285600 | A1 | 9/2019 | Klein |
| 2019/0302013 | A1 | 10/2019 | Wang |
| 2020/0011789 | A1 | 1/2020 | Sandsten |
| 2020/0176088 | A1 | 6/2020 | Kanamarlapudi |
| 2020/0182779 | A1 | 6/2020 | Kasten |
| 2020/0226426 | A1 | 7/2020 | Jarquin Arroyo |
| 2020/0393434 | A1 | 12/2020 | Li |
| 2020/0398959 | A1 | 12/2020 | Pomerantz |
| 2021/0140934 | A1 | 5/2021 | Smith |
| 2021/0156793 | A1 | 5/2021 | Leen |
| 2021/0255157 | A1 | 8/2021 | Rashid |
| 2022/0244127 | A1 | 8/2022 | Aubrey |
| 2022/0327708 | A1 | 10/2022 | Satish |
| 2023/0111401 | A1 | 4/2023 | Machover |
| 2023/0169222 | A1* | 6/2023 | Wang .................... G06F 30/20 703/1 |
| 2023/0175914 | A1 | 6/2023 | Diven |
| 2023/0177726 | A1 | 6/2023 | Spears |
| 2023/0194483 | A1 | 6/2023 | Some |
| 2023/0222271 | A1 | 7/2023 | Spackova |
| 2023/0304982 | A1* | 9/2023 | Eichenlaub ........ G01N 33/0062 |
| 2023/0324430 | A1 | 10/2023 | Reed |
| 2023/0326201 | A1 | 10/2023 | Rashid |
| 2024/0200991 | A1 | 6/2024 | Salman |
| 2024/0418693 | A1 | 12/2024 | Rashid |
| 2024/0420311 | A1 | 12/2024 | Speck |
| 2025/0067858 | A1 | 2/2025 | Boucher |
| 2025/0078240 | A1 | 3/2025 | Zielinski |
| 2025/0110007 | A1 | 4/2025 | Rashid |

FOREIGN PATENT DOCUMENTS

| | | |
|---|---|---|
| CN | 108731645 A | 11/2018 |
| CN | 109195132 A | 1/2019 |
| CN | 109614526 A | 4/2019 |
| CN | 111325801 A | 6/2020 |
| CN | 113887044 A | 1/2022 |
| CN | 114329245 A | 4/2022 |
| CN | 114416692 A | 4/2022 |
| CN | 115018327 A | 9/2022 |
| CN | 115187767 A | 10/2022 |
| EP | 0943085 B1 | 3/2004 |
| EP | 2329289 B1 | 9/2013 |
| JP | H06294500 A | 10/1994 |
| JP | H07083786 A | 3/1995 |
| JP | H07140031 A | 6/1995 |
| JP | H07190879 A | 7/1995 |
| JP | H07198523 A | 8/1995 |
| JP | 2996349 B2 | 10/1999 |
| KR | 101473956 B1 | 12/2014 |
| KR | 2015003470 | 1/2015 |
| KR | 20160123467 | 10/2016 |
| KR | 20180041828 A | 4/2018 |
| KR | 20190058230 | 5/2019 |
| KR | 102482129 B1 | 1/2023 |
| WO | 2019213280 A1 | 11/2019 |
| WO | 2020018867 A1 | 1/2020 |
| WO | 2020206008 A1 | 10/2020 |
| WO | 2020263693 A1 | 12/2020 |
| WO | 2021067844 A1 | 4/2021 |
| WO | 2021156864 A1 | 8/2021 |
| WO | 2022023226 A1 | 2/2022 |
| WO | 2022051572 A1 | 3/2022 |
| WO | 2022056152 A1 | 3/2022 |
| WO | 2022081717 A1 | 4/2022 |
| WO | 2023108041 A1 | 6/2023 |
| WO | 2023133345 A1 | 7/2023 |
| WO | 2024030523 A1 | 2/2024 |
| WO | 2024030525 A1 | 2/2024 |
| WO | 2024054640 A1 | 3/2024 |
| WO | 2024064113 A1 | 3/2024 |
| WO | 2024155857 A1 | 7/2024 |

OTHER PUBLICATIONS

Hirst, B., Jonathan, P., del Cueto, F. G., Randell, D., & Kosut, O. (2013). Locating and quantifying gas emission sources using remotely obtained concentration data. Atmospheric environment, 74, 141-158 (Year: 2013).*

Titchener et al. "Single photon Lidar gas imagers for practical and widespread continuous methane monitoring." Applied Energy 306 (2022): 118086. (11 pages).

Saunois, M., et al. (2020), The Global Methane Budget 2000-2017, Earth Syst. Sci. Data, 12, pp. 1561-1623.

Pomerantz, A. E. et al., 2022. Present global warming: a justifiable and stable metric for evaluating short-lived climate pollutants. Environmental Research Letters, 17(11), p. 114052. (6 pages).

Cusworth , D.H. et al., 2021. Intermittency of large methane emitters in the Permian Basin. Environmental Science Technology Letters, 8(7), pp. 567-573.

Chakrabarti et al., Sep. 2022, Rapid Detection of Super-Emitters Utilizing an IoT-Enabled Continuous Methane Emissions Monitoring System. In SPE Annual Technical Conference and Exhibition. OnePetro. (6 pages).

Chakrabarti et al., "Rapid Detection of Methane Super-Emitters Through Advanced Interpretation", Oct. 31-Nov. 3, 2022, Society of Petroleum Engineers, SPE-210970-MS, pp. 1-6 (Year: 2022).

Potyrailo, R.A. et al., 2020. Extraordinary performance of semi-conducting metal oxide gas sensors using dielectric excitation. Nature Electronics, 3(5), pp. 280-289.

Zimmerle, D. Metec Controlled Test Protocol: Continuous Monitoring Emission Detection And Quantification, Energy Institute, Colorado State University. https://energy.colostate.edu/wp-content/uploads/sites/28/2021/03/Continuous-Monitoring-Protocol-R1.0.pdf (31 pages).

Take control of your emissions management programme, downloaded on Dec. 15, 2023 from link https://sensorup.com/methane-emissions-management/ (12 pages).

BlueSky resources makes sense out of sensors, downloaded on Dec. 15, 2023 from linke https://blueskyresources.com/solutions/ (3 pages).

Yu, L. et al., "Methane leakage source location based on a near-infrared off-axis integrated cavity output spectroscopic ppbv-level sensor and an optimized inverse model", Infrared Physics Technology, 2022, vol. 121, pp. 1-9.

Weidmann, D. et al., "Locating and Quanitifying Methane Emissions by Inverse Analysis of Path-Integrated Concentation Data Using a Markov-Chain Monte Carlo Apporach", ACS Earth and Space Chemistry, 2022, 6(9), pp. 2190-2198.

Ye, W. et al., "Leakage source location based on Gaussain plume diffusion model using a near-infrared sensor", Infrared Physics Technology, 2020, vol. 109, pp. 1-5.

Majumder et al., "Development and Evaluation of Ensemble Learning-based Environmental Methane Detection and Intensity Prediction Models", Dec. 17, 2023, pp. 1-16 (Year: 2023).

(56) References Cited

OTHER PUBLICATIONS

Andrews et al., "Quantitative Mapping of Methane Emissions in Oil Gas Facilities", Oct. 16-18, 2023, Society of Petroleum engineers, SPE-214909-MS, pp. 1-10 (Year: 2023).
Imbiriba et al., "Augmented physics-based machine learning for navigation and tracking", 2023, IEEE Transactions on Aerospace and electronic Systems, pp. 1-13 (Year: 2023).
Hanna, S. R. et al., 1982, Handbook on Atmospheric Diffusion, DOE/TIC-11223 (7 pages).
"AERMOD" downloaded from Wikipedia on Jul. 31, 2024 from [https://en.wikipedia.org/wiki/AERMOD], Last Edited Mar. 4, 2022, 2 pages.
Search Report issued in Norwegian Patent Application No. 20230720 on Jan. 23, 2024; 10 pages.
Office Action issued in U.S. Appl. No. 18/480,279 dated Nov. 7, 2023, 13 pages.
Office Action issued in U.S. Appl. No. 18/537,978 dated Mar. 7, 2024, 10 pages.
International Search Report and Written Opinion issued in PCT Application PCT/US2023/083724, dated Apr. 30, 2024 (9 pages).
International Search Report and Written Opinion issued in PCT Application PCT/US2023/033106, dated Jan. 23, 2024 (7 pages).
International Search Report and Written Opinion issued in the PCT Application No. PCT/US2023/029361 dated Nov. 14, 2023, 11 pages.
International Search Report and Written Opinion issued in the PCT Application No. PCT/US2023/029363 dated Nov. 21, 2023, 10 pages.
International Search Report and Written Opinion issued in the PCT Application No. PCT/US2024/012087 dated May 23, 2024, 11 pages.
International Search Report and Written Opinion issued in PCT Application PCT/US2023/010475, dated May 2, 2023 (11 pages).
International Preliminary Report on Patentability issued in the PCT Application No. PCT/US2023/010475 dated Jul. 25, 2024, 8 pages.
International Search Report and Written Opinion issued in PCT Application PCT/US2023/032307, dated Dec. 26, 2023 (10 pages).
International Search Report and Written Opinion issued in the PCT Application No. PCT/US2024/033102 dated Sep. 24, 2024, 10 pages.
Combined Search and Exam Report issued in United Kingdom patent Application No. GB2409015.1 dated Oct. 8, 2024, 5 pages.
Notice of Allowance issued in U.S. Appl. No. 18/537,978 dated Aug. 19, 2024, 10 pages.

* cited by examiner

EMISSION DETECTING CAMERA PLACEMENT PLANNING USING 3D MODELS

CROSS REFERENCE

This application claims the benefit of U.S. Provisional Patent App. No. 63/507,342, "Emission Detecting Camera Placement Planning Using 3D Models," filed Jun. 9, 2023, the complete disclosure of which is hereby incorporated herein by reference.

FIELD

Embodiments provided herein relate to emission detection. More particularly, embodiments provided herein relate to emission detection camera placement planning using 3D models.

BACKGROUND

Worksites and facilities require various detection and monitoring technologies in order to actively track, locate, and mitigate any release of any harmful, polluting, illegal, or other chemical substance into the air or surrounding environment. One such technology is the use of light detection and ranging ("LiDAR") cameras to identify one or more emissions of chemicals in or around a site. The LiDAR camera can identify a leak source accurately if the LiDAR camera has both an appropriate line of sight of the emission and a proper background that is within the maximum range of the camera.

Worksites and facilities frequently have a multitude of sources from which a chemical substance can be emitted, varied infrastructures that obstruct a line of sight, and spacing, safety, and power considerations that limit placement of a LiDAR camera. Current processes for determining the correct placement of a LiDAR camera rely upon a trained engineer to study and become familiar with the site in order to estimate the best position for the camera(s) to be located. Such estimation, however, provides inconsistent results and is frequently, if not always, sub-optimal.

There is a need, therefore, for improved processes for locating emission detecting camera(s) at a worksite in an optimal location for such detection.

SUMMARY

Processes for locating an emission detecting camera at a worksite are provided. In some embodiments, the process for locating an emission detecting camera at a worksite can include creating a site model that can include building a three-dimensional ("3D") model of the worksite, identifying a plurality of potential emission source locations, and identifying a plurality of potential camera locations. The process can also include completing a camera coverage calculation loop that can include choosing a first camera location from the plurality of potential camera locations and completing a source calculation loop. The source calculation loop can include (i) choosing an emission source location from the plurality of the potential emission source locations to provide a first emission source location, (ii) calculating a coverage value of the first camera location for the first emission source location using the 3D model, (iii) repeating steps (i) and (ii) until all of the plurality of potential emission source locations have been chosen and coverage values of the first camera location for all of the plurality of potential emission source locations have been calculated to provide a plurality of coverage values, and (iv) calculating a coverage ratio from the plurality of coverage values from the source calculation loop for the first camera location to provide a first coverage ratio. The coverage ratio can be the fraction of the points of interest on the site emissions from which can be detected by the camera, i.e., the points of interest that lie in the line of sight and not farther than camera range specification.

The process can also include repeating the camera coverage calculation loop for at least one additional potential camera location of the plurality of potential camera locations to provide a plurality of coverage ratios. The process can also include creating an ordered list of the potential camera locations based on the plurality of coverage ratios. The process can also include choosing a camera position at the worksite from the ordered list.

In other embodiments, a process for locating an emission detecting camera at a worksite can include creating a site model that can include building a 3D model of the worksite, identifying a plurality of potential emission source locations, identifying a plurality of emission source location cost values, and identifying a plurality of potential camera locations. The process can also include calculating a plurality of loss values using the plurality of emission source location cost values and the plurality of potential camera locations. The process can also include creating a location list based on a minimizing function and the plurality of loss values. The process can also include completing a camera coverage calculation loop that can include choosing a first camera location from the location list and completing a source calculation loop. The source calculation loop can include (i) choosing an emission source location from the plurality of the potential emission source locations to provide a first emission source location, (ii) calculating a coverage value of the first camera location for the first emission source location using the 3D model, (iii) repeating steps (i) and (ii) until all of the plurality of emission source locations have been chosen and coverage values of the first camera location for all of the plurality of emission source locations have been calculated to provide a plurality of coverage values, and (iv) calculating a coverage ratio from the plurality of coverage values from the source calculation loop for the first camera location to provide a first coverage ratio. The process can also include repeating the camera coverage calculation loop for at least one additional potential camera location from the location list to provide a plurality of coverage ratios. The process can also include creating an ordered list of the location list based on the plurality of coverage ratios. The process can also include choosing a camera position at the worksite from the ordered list.

In other embodiments a process for locating an emission detecting camera at a worksite can include creating a site model that can include building a 3D model of the worksite, identifying a plurality of potential emission source locations, and identifying a plurality of potential camera locations. The process can also include completing an emission coverage calculation loop that can include choosing a first emission source location from the plurality of potential emission source locations and completing a camera calculation loop. The camera calculation loop can include (i) choosing a camera location from the plurality of the potential camera locations to provide a first camera location, (ii) calculating a coverage value of the first emission source location for the first camera location using the 3D model, (iii) repeating steps (i) and (ii) until all of the plurality of camera locations have been chosen and coverage values of the first emission source location for all of the plurality of camera locations have been calculated to provide a plurality of coverage values, and (iv) calculating a coverage ratio from the plurality of coverage values from the source calculation loop for the first emission source location to provide a first coverage ratio. The process can also include repeating the emission coverage calculation loop for at least one additional potential emission source location of the plurality of potential emission source locations to provide a plurality of coverage ratios. The process can also include creating an ordered list of the potential camera locations based on the plurality of coverage ratios. The process can also include choosing a camera position at the worksite from the ordered list.

BRIEF DESCRIPTION OF THE DRAWINGS

So that the manner in which the above recited features of the present invention can be understood in detail, a more particular description of the invention, briefly summarized above, may be had by reference to embodiments, some of which can be illustrated in the appended drawings. It can be noted, however, that the appended drawings illustrate only typical embodiments of this invention and are, therefore, not to be considered limiting of its scope, for the invention may admit to other equally effective embodiments. It can be emphasized that the figures can be not necessarily to scale and certain features and certain views of the figures can be shown exaggerated in scale or in schematic for clarity and/or conciseness.

DETAILED DESCRIPTION

It is to be understood that the following disclosure describes several exemplary embodiments for implementing different features, structures, or functions of the invention. Exemplary embodiments of components, arrangements, and configurations are described below to simplify the present disclosure; however, these exemplary embodiments are provided merely as examples and are not intended to limit the scope of the invention. Additionally, the present disclosure can repeat reference numerals and/or letters in the various embodiments and across the figures provided herein. This repetition is for the purpose of simplicity and clarity and does not in itself dictate a relationship between the various embodiments and/or configurations. Moreover, the exemplary embodiments presented below can be combined in any combination of ways, i.e., any element from one exemplary embodiment can be used in any other exemplary embodiment, without departing from the scope of the disclosure.

Additionally, certain terms are used throughout the following description and claims to refer to particular components. As one skilled in the art will appreciate, various entities can refer to the same component by different names, and as such, the naming convention for the elements described herein is not intended to limit the scope of the invention, unless otherwise specifically defined herein. Further, the naming convention used herein is not intended to distinguish between components that differ in name but not function.

Furthermore, in the following discussion and in the claims, the terms "including" and "comprising" are used in an open-ended fashion, and thus should be interpreted to mean "including, but not limited to."

The term "or" can be intended to encompass both exclusive and inclusive cases, i.e., "A or B" can be intended to be synonymous with "at least one of A and B," unless otherwise expressly specified herein.

The indefinite articles "a" and "an" refer to both singular forms (i.e., "one") and plural referents (i.e., one or more) unless the context clearly dictates otherwise. For example, embodiments using "a building" include embodiments where one, two, or more buildings can be present at a given site, unless specified to the contrary or the context clearly indicates that only one building is present.

Unless otherwise indicated herein, all numerical values can be "about" or "approximately" the indicated value, meaning the values take into account experimental error, machine tolerances and other variations that would be expected by a person having ordinary skill in the art. It should also be understood that the precise numerical values used in the specification and claims constitute specific embodiments. Efforts have been made to ensure the accuracy of the data in the examples. However, it should be understood that any measured data inherently contains a certain level of error due to the limitation of the technique and/or equipment used for making the measurement.

Each of the appended claims defines a separate invention, which for infringement purposes can be recognized as including equivalents to the various elements or limitations specified in the claims. Depending on the context, all references to the "invention" may in some cases refer to certain specific embodiments only. In other cases, it will be recognized that references to the "invention" will refer to subject matter recited in one or more, but not necessarily all, of the claims. Each of the inventions will now be described in greater detail below, including specific embodiments, versions, and examples, but the inventions are not limited to these embodiments, versions, or examples, which are included to enable a person having ordinary skill in the art to make and use the inventions when the information in this disclosure is combined with publicly available information and technology.

Figure 1:
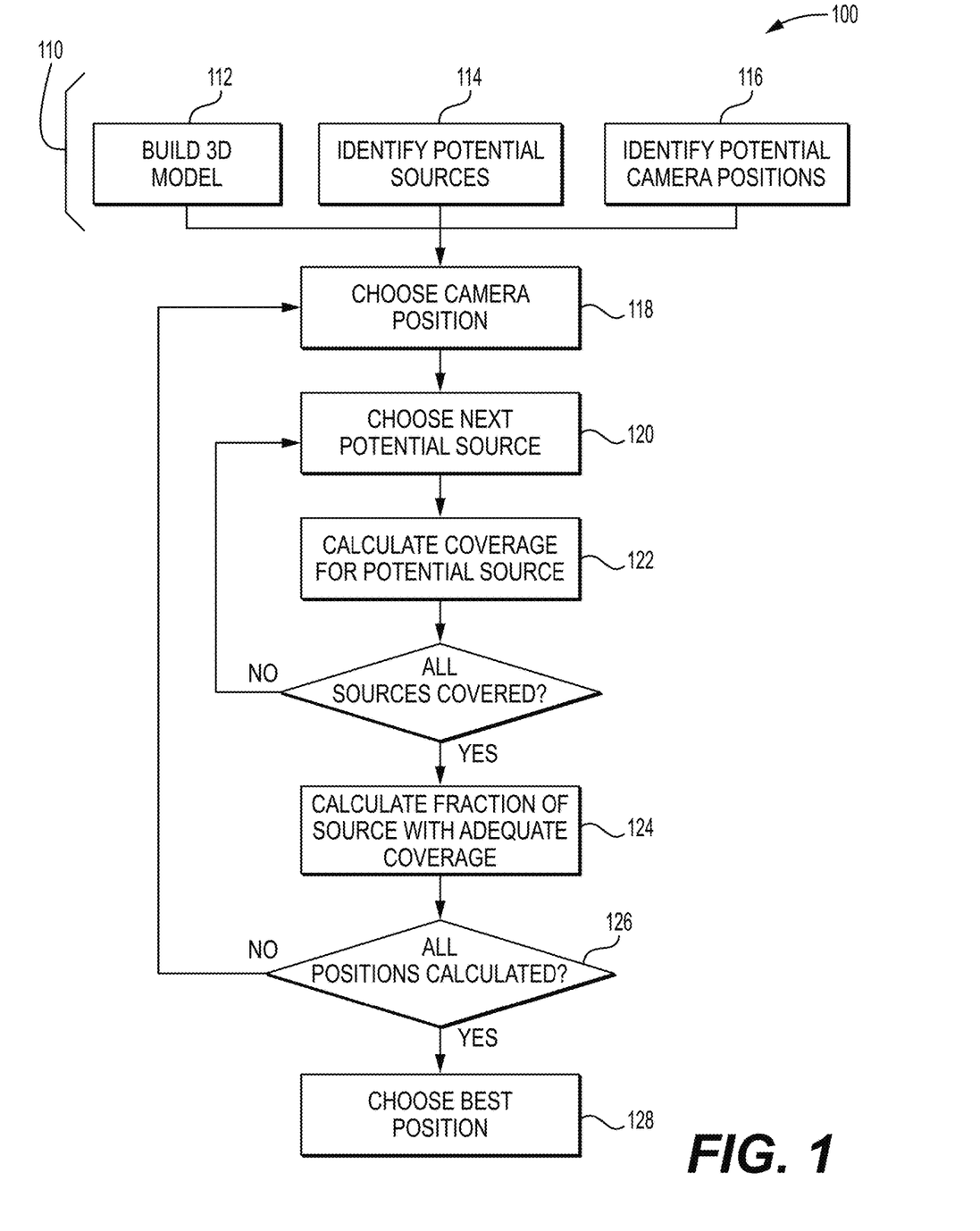
FIG. 1 depicts a flowchart representation of a single camera planning workflow, according to one or more embodiments described.

FIG. 1 depicts a flowchart representation of a single camera planning workflow 100, according to one or more embodiments. The camera planning workflow 100 can include a site model creation stage 110. The site model creation stage 110 can include substages. For example, at substage 112, a computing device can build a 3D model of the site. The 3D model can be digitally built using any other suitable technology that can scan an area and return position data and/or x-, y-, z-coordinates for multiple discrete points. For example, the 3D model can be built using elevation data from LiDAR, photogrammetry, CAD data, laser scanners, white-light digitizers, by extruding equipment located on an aerial image to a defined height, or any other suitable technology that can scan an area and return position data and/or x-, y-, z-coordinates for multiple discrete points. Building the 3D model can also include determining a line of sight or a line of view for any given location within the 3D model.

At substage 114, the computing device can identify one or more potential emission source locations. In some embodiments, the computing device can display the 3D model of the site on a display, and a user can designate one or more locations within the 3D model of the site. The one or more potential emission source locations can be or can include, but are not limited to, any facility, equipment, pipeline, device, building, and/or other location of interest where a chemical leak or emission could potentially occur.

At substage 116, the computing device can identify one or more potential camera locations. In some embodiments, this can be performed by a user designating one or more locations within the 3D model of the site. The one or more potential camera locations can be any location that can suitably allow a camera to be placed in, around, or near the site. In some embodiments, the location that can suitably allow a camera to be placed at the location if the location can support a camera mast or includes a suitable structure the camera can be mounted on, provide power to the camera, avoid interference with the site, and the like, and/or any combination thereof.

The camera planning workflow 100 can also include a camera coverage calculation loop that begins at stage 118. The camera coverage calculation loop can include choosing a camera location from the plurality of potential camera locations and completing a source calculation loop. At stage 118, a camera position can be chosen. In some embodiments, choosing the camera position can include placing a camera within the 3D model of the site at one of the potential camera locations. In some embodiments, choosing the camera location can be performed manually by a user or by any suitable algorithm for choosing from a list. At stage 120, the source calculation loop can include choosing an emission source location from the plurality of the potential emission source locations to provide a first emission source location. In some embodiments, choosing the source location can include selecting one of the potential emission source locations within the 3D model of the site. In some embodiments, choosing the source location can be performed manually by a user or by any suitable algorithm for choosing from a list. At stage 122, the source calculation loop can include calculating a coverage value of the first camera location for the first emission source location using the 3D model of the worksite. Stages 120 and 122 can be repeated until all of the plurality of potential emission source locations have been chosen and coverage values of the first camera location for all of the plurality of potential emission source locations have been calculated to provide a plurality of coverage values.

At stage 124, the source calculation loop can include calculating a fraction of sources with adequate coverage. This can include, for example, taking one or more scan angle measurements to determine good scan angles and bad scan angles. The term "good scan angle" refers to camera angles where sight is unobstructed between the location of the camera and the location of the potential emission source, and the location of the potential emission source is within the maximum range of the camera. The term "bad scan angle" refers to camera angles where sight is obstructed between the location of the camera and the location of the potential emission source and/or the location of the potential emission source is outside the maximum range of the camera. The coverage value of a chosen camera location for a chosen potential emission source location can be calculated by comparing the total number of good scan angles to the total number of bad scan angles. In one or more embodiments, the camera location can be determined to adequately cover the potential emission source location if the calculated coverage value for the camera location and the potential emission source location exceeds a user defined threshold.

At stage 126, the camera planning workflow 100 can also include repeating the camera coverage calculation loop for at least one additional potential camera location of the plurality of potential camera locations to provide a plurality of coverage ratios. In some embodiments, repeating the camera coverage calculation loop can continue until all potential or a user defined or predetermined number of camera locations have a calculated coverage ratio.

At stage 128, the best camera position can be chosen. This can include, for example, creating an ordered list of the potential camera locations based on the plurality of coverage ratios. In some embodiments, the ordered list can rank the potential camera locations from greatest coverage to least coverage in order to determine which potential camera location(s) provide the greatest coverage ratio. In some embodiments, the user can select an ideal camera location from the ordered list that corresponds to the camera location with the greatest coverage ratio or any other coverage ratio that is less than the greatest coverage ratio. In one or more embodiments, the ordered list can be used to create a multiple camera list by taking the union of two or more potential camera location coverage ratios. The multiple camera list can be ordered from greatest coverage to least coverage in order to determine which combination of camera locations provide the greatest coverage ratio. In some embodiments, the user can select an ideal combination of camera locations from the ordered list that corresponds to camera locations with the greatest coverage ratio or any other coverage ratio that is less than the greatest coverage ratio. Once one or more camera positions have been chosen from the ordered list, one or more cameras can be installed at the one or more camera positions.

In some embodiments, the camera(s) can be a LIDAR camera. In some embodiments, the potential emission(s) the camera(s) can be configured to detect can be or can include, but is not limited to, ammonia, hydrogen sulfide, carbon monoxide, carbon dioxide, nitrous oxide, sulfur dioxide, one or more hydrocarbons, volatile organic compounds ("VOCs"), and the like. In at least one embodiment, the potential emission(s) the camera(s) can be configured to detect can be or can include one or more hydrocarbons, e.g., methane, ethane, propane, and the like, or any combination thereof.

In some embodiments, the potential camera locations can include additional camera information such as fixed mounting height, variable mounting range, mounting footprint, and the like. The fixed mounting height can include the height measured above the surface immediately beneath or near the potential camera location. The variable mounting range can include the range measured from the lowest height above the surface immediately beneath or near the potential camera location to the highest height above the surface immediately beneath or near the potential camera location. The mounting footprint can include the cross-sectional area of the camera and/or any mast, mounting stand, structure, or the like used to support and/or reposition the camera. In some embodiments, the additional camera information can be used to further optimize and/or modify the camera planning workflow 100. The further optimized and/or modified camera planning workflow 100 can include camera type selection, camera mast type selection, camera motion planning, and the like, and/or any combination thereof.

In some embodiments, the user can treat one or more potential emission source locations as being higher value, higher risk, more important, and/or necessary to monitor more closely. As such, in some embodiments, the coverage values can be weighted according to one or more user defined parameters. The user defined parameters can include, but are not limited to, cost values, additional camera information, risk values, priority values, and the like, and/or any combination thereof. The cost values can include the specific, general, and/or aggregated costs associated with maintenance, construction, remediation, clean-up, mitigation, fines, or any other costs related to the worksite and/or worksite emissions. The cost values can be used to calculate a plurality of loss values associated with each potential camera location. The loss values can include the total or aggregate loss of money for one or more chosen potential camera locations, including loss of money from choosing one or more camera locations, loss of money from uncovered worksite locations, and the like, and/or any combination thereof. In some embodiments, a cost function can be used to create a location list. The cost function can include using the plurality of loss values associated with each potential camera location and a minimizing model. The minimizing model can include any suitable optimization technique for determining minimum values, such as a least-squares regression, a steepest-descent model, and the like, and/or any combination thereof. In some embodiments, the coverage values can be automatically weighted based, at least in part, on the particular type of potential emission source. For example, a database can be established that includes potential facilities, equipment, pipelines, devices, buildings, and/or other location of interest where a chemical leak or emission could potentially occur and can assign weighted coverage values based on the particular type of location from which the chemical leak or emission can potentially occur.

In some embodiments, the camera planning workflow 100 can be performed manually, automatically, and/or any combination thereof. Each step of the camera planning workflow 100 can move to the next step automatically, with digital confirmation or verification, with manual confirmation or verification, and/or any combination thereof. In some embodiments, the steps of the camera planning workflow 100 can be repeated until an automatic, digital, and/or manual confirmation can verify the step is completed within a sufficient degree of success. In some embodiments, the camera planning workflow 100 can be stopped and/or restarted as needed.

It should be understood that the camera workflow 100 can be modified by replacing the camera coverage calculation loop with an emission coverage calculation loop. In such embodiment, the modified camera workflow can include creating the site model that includes building the 3D model of the worksite, identifying the plurality of potential emission source locations, and identifying a plurality of potential camera locations. The modified camera workflow can also include completing the emission coverage calculation loop that can include choosing a first emission source location from the plurality of potential emission source locations and completing a camera calculation loop. The camera calculation loop can include (i) choosing a camera location from the plurality of the potential camera locations to provide a first camera location; (ii) calculating a coverage value of the first emission source location for the first camera location using the 3D model; and (iii) repeating steps (i) and (ii) until all of the plurality of camera locations have been chosen and coverage values of the first emission source location for all of the plurality of camera locations have been calculated to provide a plurality of coverage values. The modified camera workflow can also include (iv) calculating a coverage ratio from the plurality of coverage values from the source calculation loop for the first emission source location to provide a first coverage ratio. The modified camera workflow can also include repeating the emission coverage calculation loop for at least one additional potential emission source location of the plurality of potential emission source locations to provide a plurality of coverage ratios. The modified camera workflow can also include creating an ordered list of the potential camera locations based on the plurality of coverage ratios. The modified camera workflow can also include choosing a camera position at the worksite from the ordered list.

It should also be understood that, in some embodiments, the modified camera workflow can also include identifying a plurality of emission source location cost values in the creation of the site model. As such, in some embodiments, the modified camera workflow can also include calculating a plurality of loss values using the plurality of emission source location cost values and the plurality of potential camera locations and creating a location list based on a cost function and the plurality of loss values; completing a camera coverage calculation loop. In such an embodiment, the camera coverage calculation loop in the modified camera workflow can include choosing the first camera location (and additional camera locations) from the location list.

Figure 2:
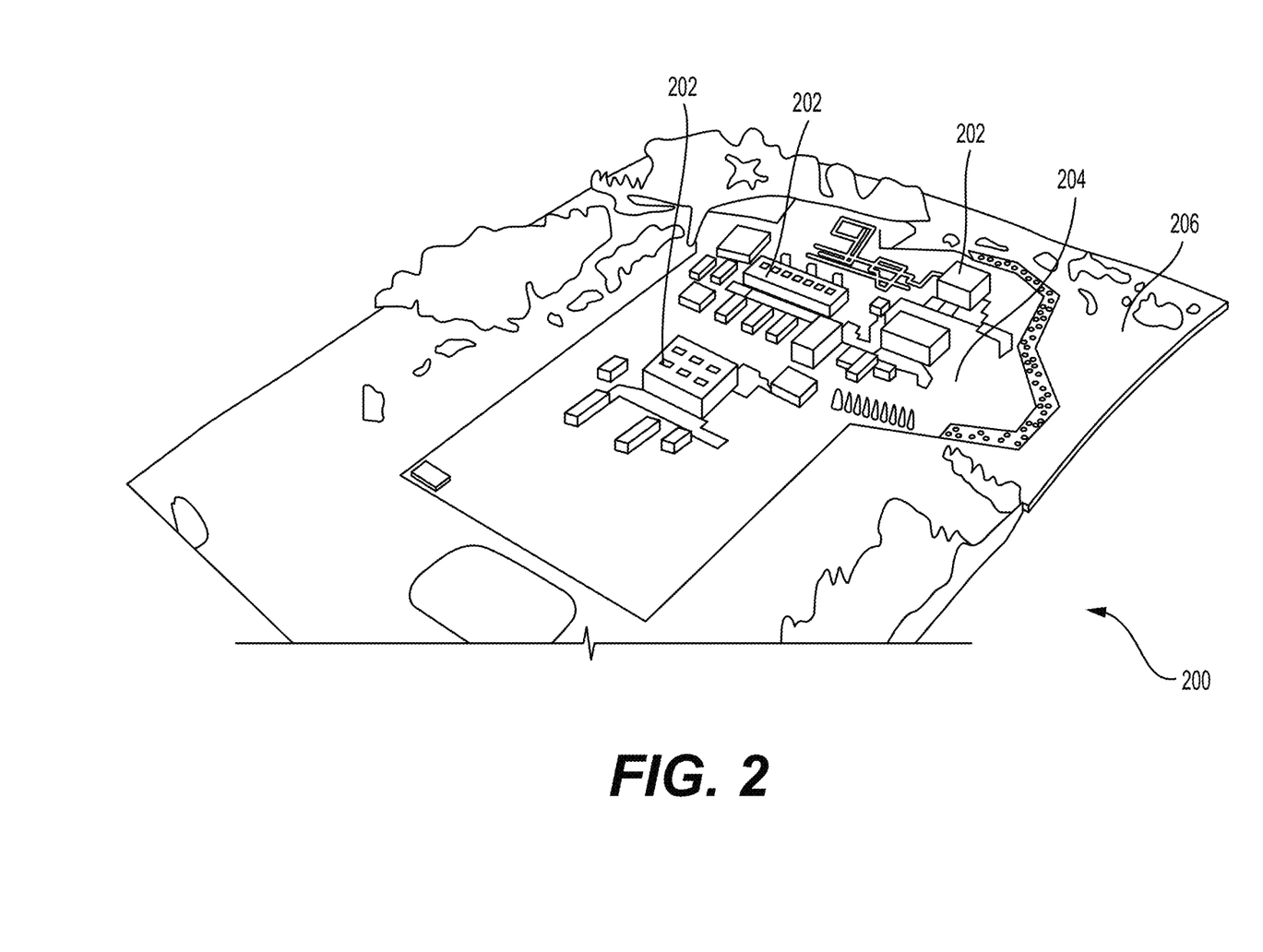
FIG. 2 depicts an illustrative 3D site model of a worksite for use in a camera coverage calculation, according to one or more embodiments described.

FIG. 2 depicts an illustrative 3D model 200 of a worksite for use in a camera coverage calculation, according to one or more embodiments. In some embodiments, the 3D site model 200 can include geometries, shapes, contours, silhouettes, outlines, and the like, and/or any combination thereof, of the buildings, facilities, grounds, terrain, and the like, and/or any combination thereof, of the worksite. In some embodiments, the 3D model 200 can be configured to allow a user to locate or designate a camera location. The camera location can provide the user with visibility and/or line of sight information based on the camera location within the 3D site model 200.

Figure 3:
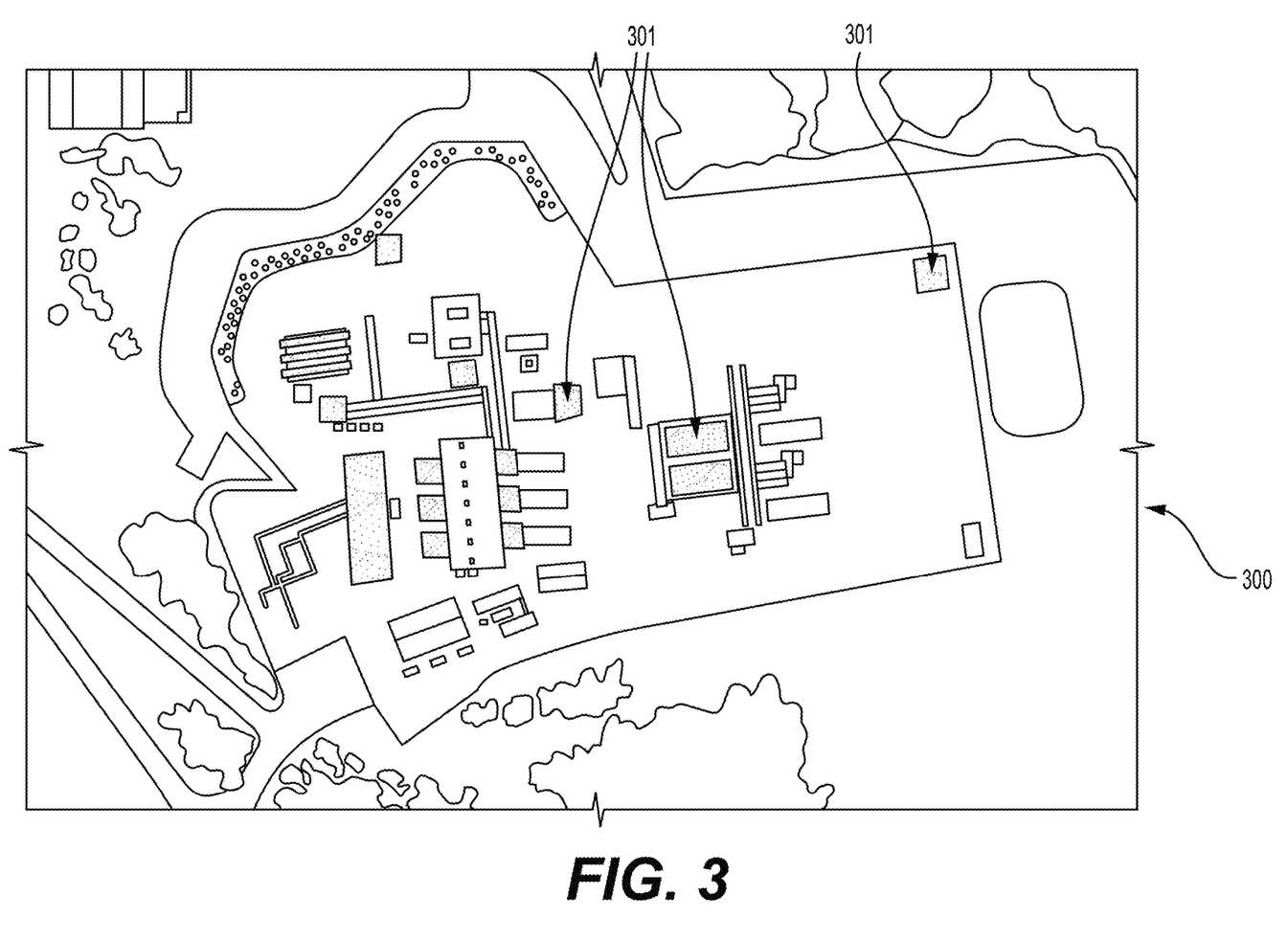
FIG. 3 depicts an annotated site image with potential emission source locations, according to one or more embodiments described.

FIG. 3 depicts an annotated site image with potential emission source locations 300, according to one or more embodiments. The annotated site image with potential emission source locations 300 can be an image, scan, photograph, diagram, or the like, and/or any combination thereof, capable of displaying relevant worksite locations where emissions could occur. The annotated site image with potential emission source locations 300 can include one or more potential emission source locations 301. The one or more potential emission source locations 301 can include any location within the worksite from which emissions could occur.

Figure 4:
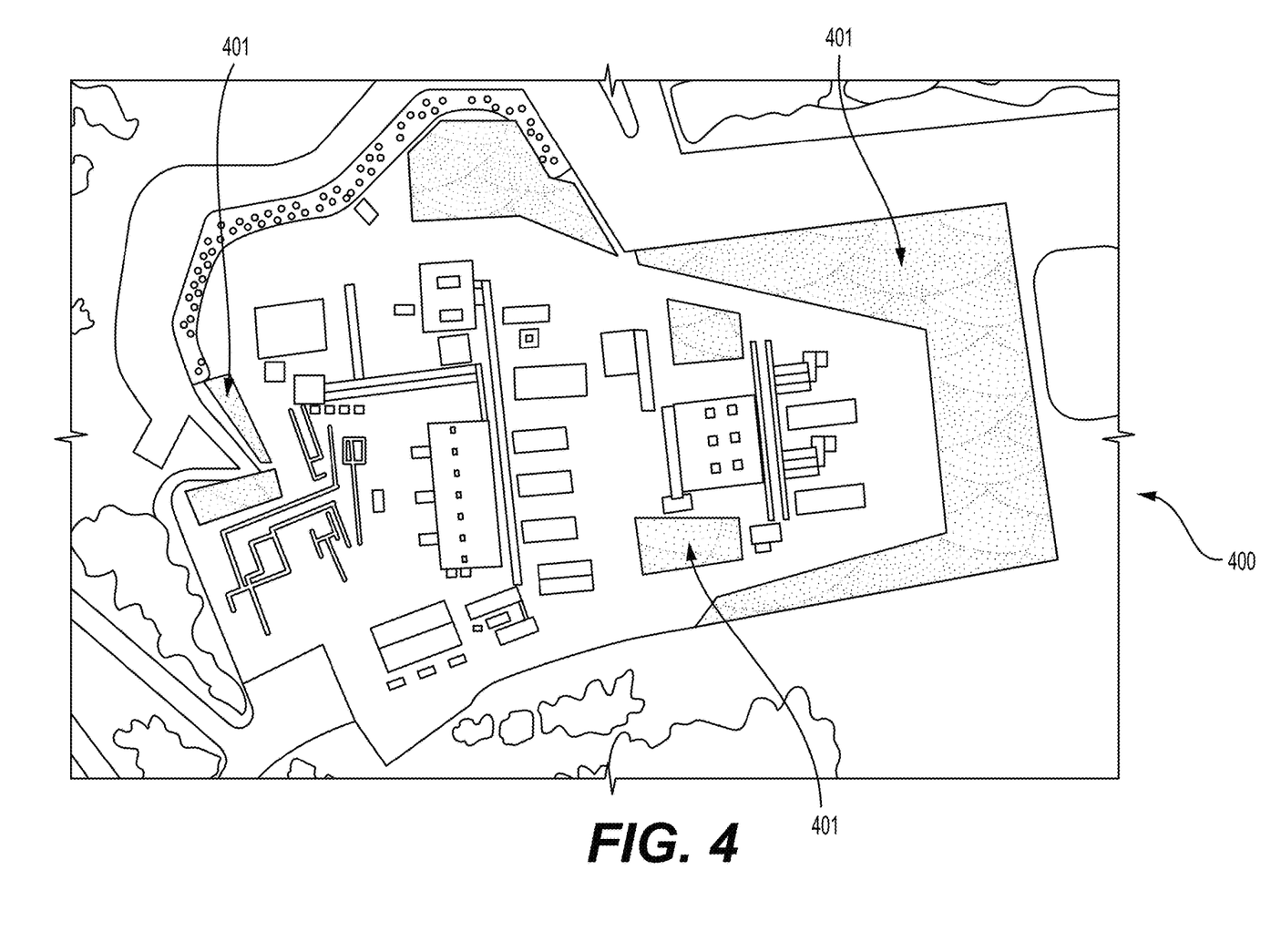
FIG. 4 depicts an annotated site image with potential camera locations, according to one or more embodiments described.

FIG. 4 depicts an annotated site image with potential camera locations 400, according to one or more embodiments. The annotated site image with potential camera locations 400 can be an image, scan, photograph, diagram, or the like, and/or any combination thereof, capable of displaying relevant worksite locations where cameras could be located or placed. The annotated site image with potential camera locations 400 can include one or more potential camera locations 401. The one or more potential camera locations 401 can include any location within the worksite where cameras could be located or placed.

Figure 5:
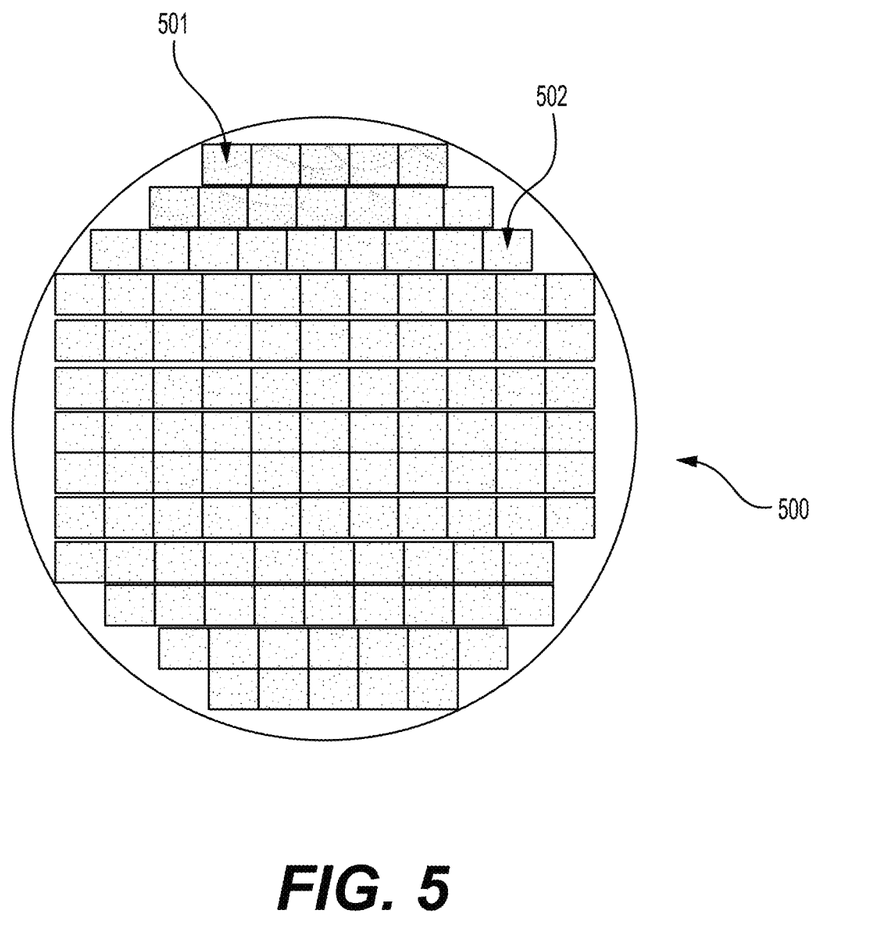
FIG. 5 depicts a graphical representation of a relationship between scan angles for a camera coverage calculation, according to one or more embodiments described.

FIG. 5 depicts a graphical representation of a relationship between scan angles for a camera coverage calculation 500, according to one or more embodiments. The relationship between scan angles for a camera coverage calculation 500 can include one or more scan angles for a camera placed in a selected location. The scan angles can include a plurality of camera angles in the horizontal and/or vertical direction, measured in degrees. The scan angles can be determined by the user or a mathematical threshold to be either bad scan angles 501 or good scan angles 502. Bad scan angles 501 can include camera angles in which the camera line of sight is obstructed, blocked, or otherwise prevented from sufficiently viewing the worksite at those camera angles and/or where the emission source is located outside a range of the camera. Good scan angles 502 can include a plurality of camera angles in which the camera line of sight is not obstructed, blocked, or otherwise prevented from sufficiently viewing the worksite at those camera angles and the emission source is located within a range of the camera.

Figure 6:
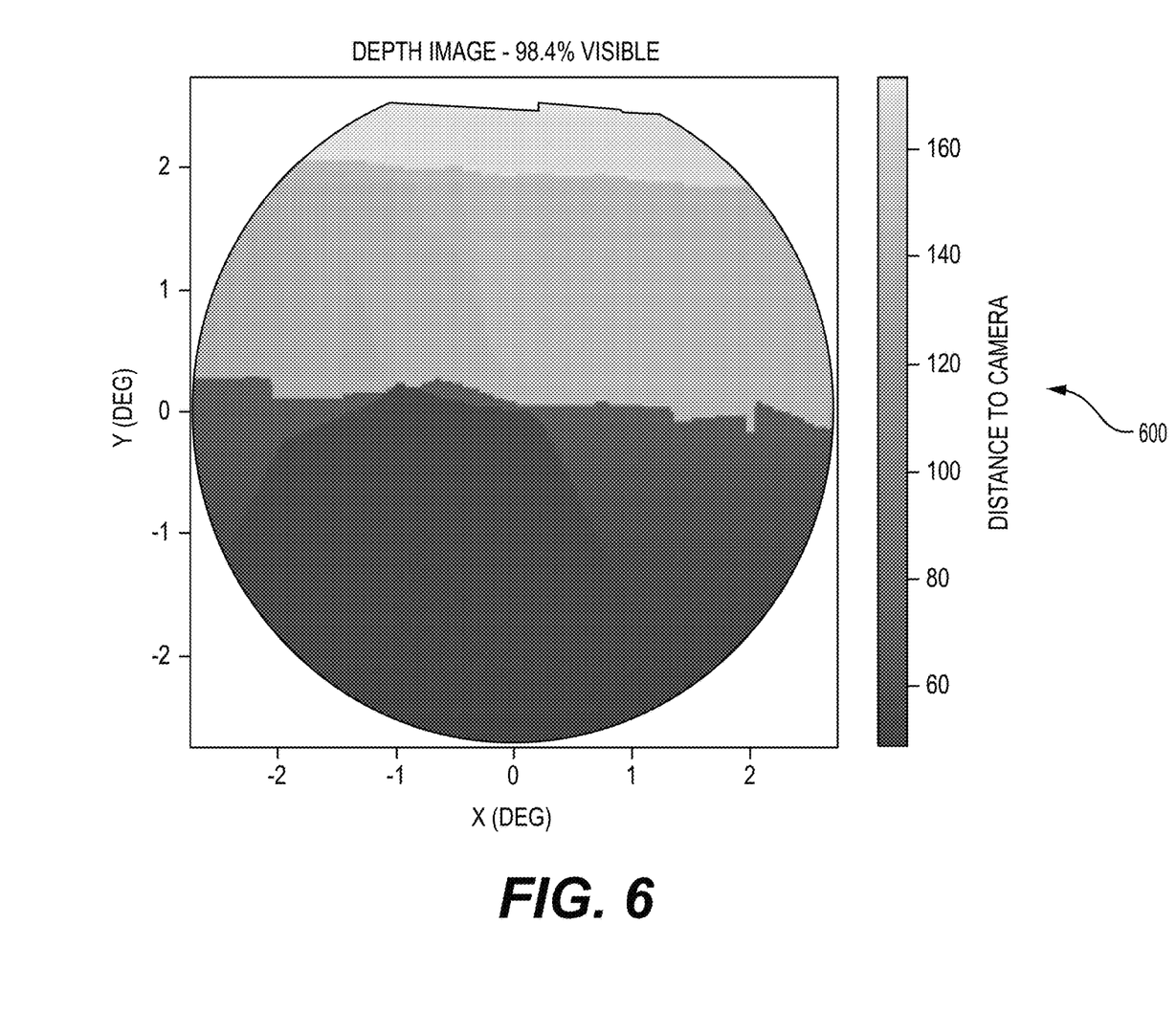
FIG. 6 depicts a graphical representation of a simulated field of view for a potential camera location and a potential emission source location, according to one or more embodiments described.

FIG. 6 depicts a graphical representation of a simulated field of view 600 for a potential camera location and potential emission source location, according to one or more embodiments. The simulated field of view 600 can include the maximum visible distances available to the potential camera location as chosen by the user when facing the potential emission source location as chosen by the user.

Figure 7:
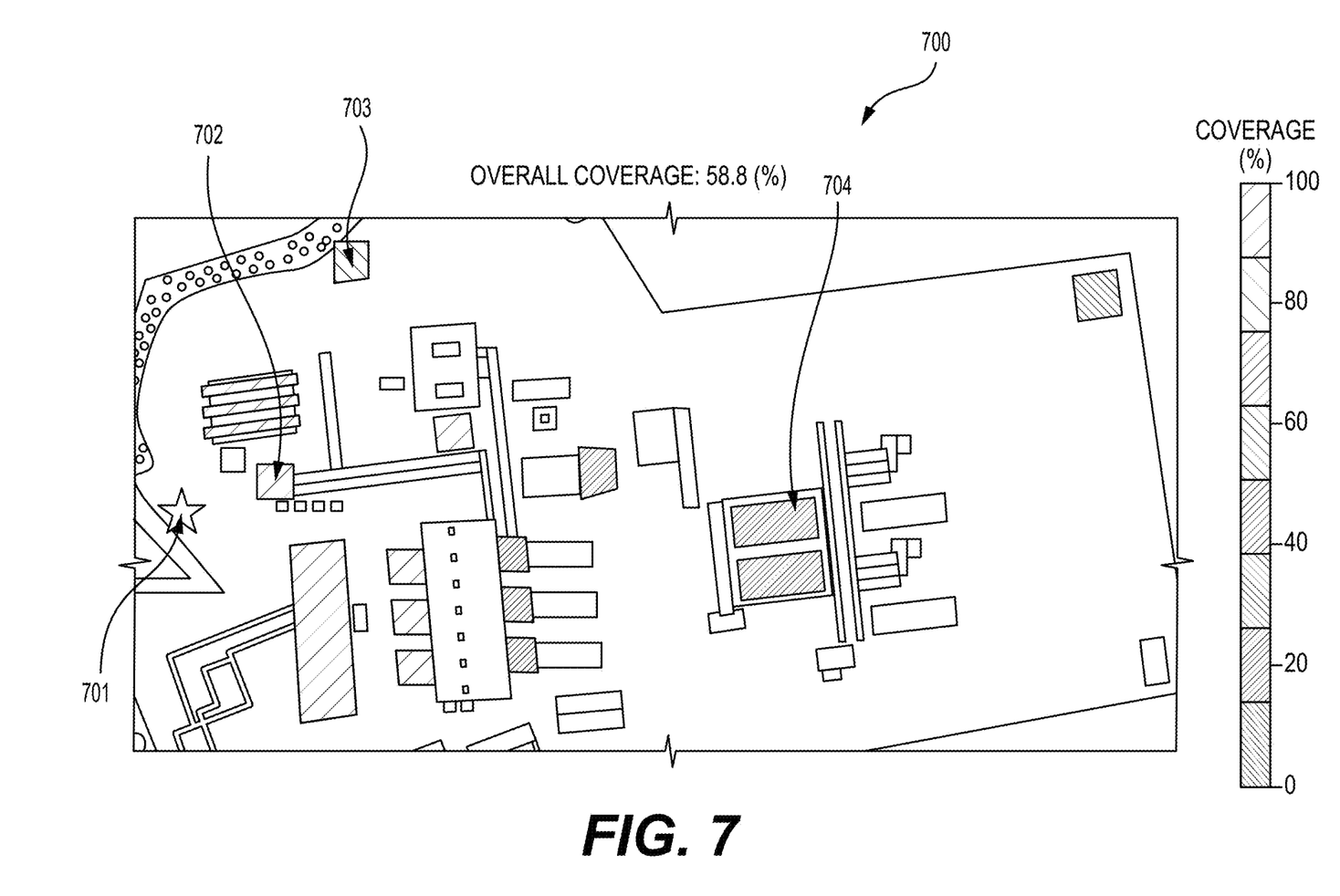
FIG. 7 depicts an annotated site image for a potential camera location with a camera coverage calculation for each potential emission source location, as shown in FIG. 2, according to one or more embodiments described.

FIG. 7 depicts an annotated site image for a potential camera location 701 with a camera coverage calculation 700 for each potential emission source location 301, as shown in FIG. 3, according to one or more embodiments. The annotated site image for the potential camera location 701 with a camera coverage calculation 700 can be an image, scan, photograph, diagram, or the like, and/or any combination thereof, capable of displaying relevant worksite locations where cameras could be located or placed. The annotated site image for the potential camera location 701 with a camera coverage calculation 700 can include a high coverage location 702, a moderate coverage location 703, and a low coverage location 704. The selected camera location 701 can be selected from any one of the potential camera locations 401. In some embodiments, the high coverage location 702 can be any potential emission source location 301 whose camera coverage calculation can be greater than 70%, 75%, or 80% coverage of the potential emission. In some embodiments, the moderate coverage location 703 can be any potential emission source location 301 whose camera coverage calculation between 35%, 40%, or 50% and 55%, 60%, or 65% coverage of the potential emission. In some embodiments, the low coverage location 703 can be any potential emission source location 301 whose camera coverage calculation can be less than 20%, 25%, or 30% coverage of the potential emission.

Figure 8:
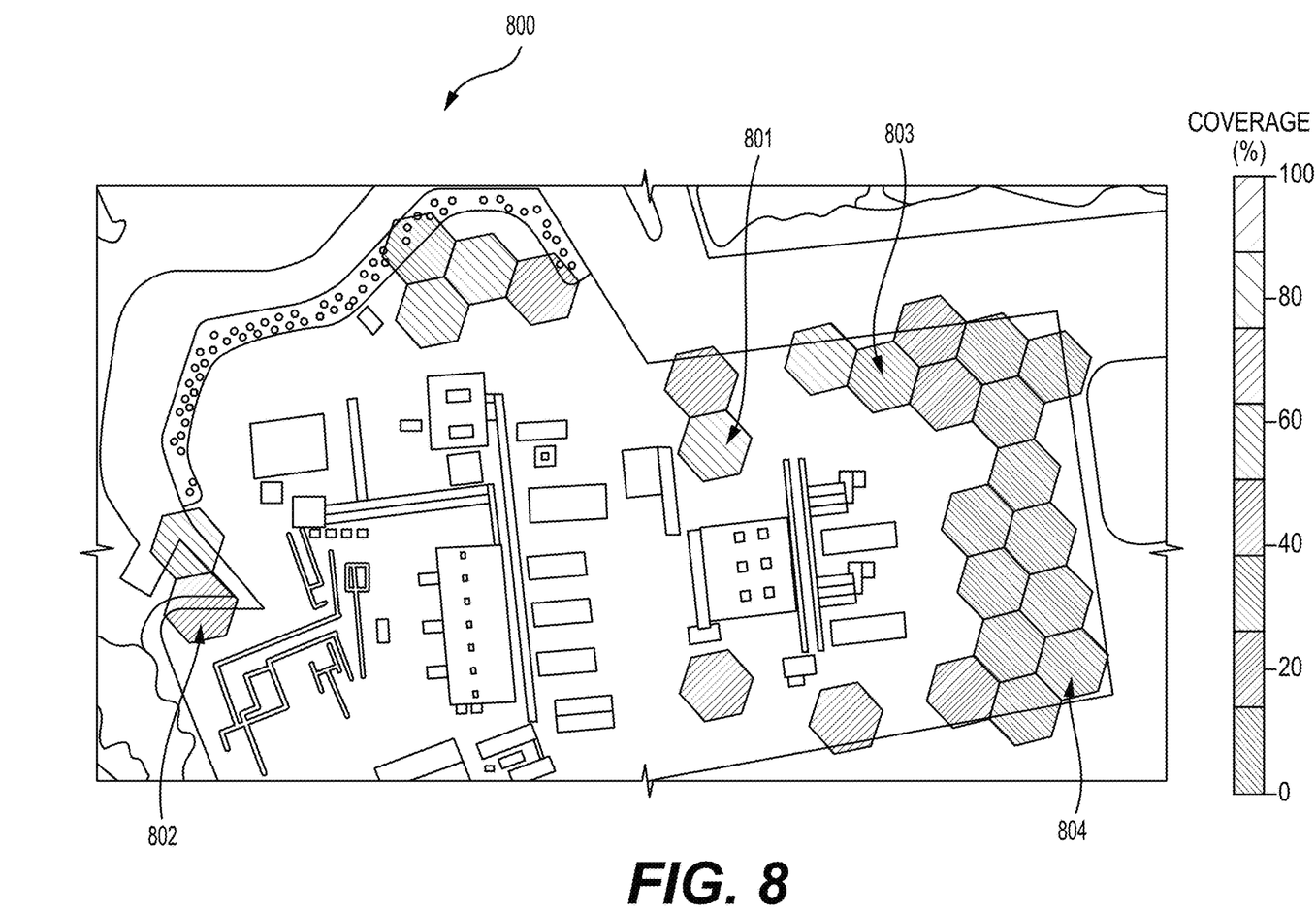
FIG. 8 depicts an annotated site image with a coverage ratio for each potential camera location, as shown in FIG. 3, according to one or more embodiments described.

FIG. 8 depicts an annotated site image with a coverage ratio 800 for each potential camera location, as shown in FIG. 4, according to one or more embodiments. The annotated site image with a coverage ratio 800 can be an image, scan, photograph, diagram, or the like, and/or any combination thereof, capable of displaying relevant worksite locations where cameras could be located or placed. The annotated site image with a coverage ratio 800 can include a high coverage total 801, a moderate coverage total 802, and a low coverage total 803. In some embodiments, the high coverage total 801 can be any potential camera location 401 whose overall coverage calculation can be greater than 70%, 75%, or 80% coverage of the potential emission source. In some embodiments, the moderate coverage total 802 can be any potential camera location 401 whose camera coverage calculation can be between 35%, 40%, or 50% and 55%, 60%, or 65% coverage of the potential emission. In some embodiments, the low coverage total 802 can be any potential emission source location 201 whose camera coverage calculation can be less than 20%, 25%, or 30% coverage of the potential emission source.

Certain embodiments and features have been described using a set of numerical upper limits and a set of numerical lower limits. It should be appreciated that ranges including the combination of any two values, e.g., the combination of any lower value with any upper value, the combination of any two lower values, and/or the combination of any two upper values are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art.

Various terms have been defined above. To the extent a term used in a claim can be not defined above, it should be given the broadest definition persons in the pertinent art have given that term as reflected in at least one printed publication or issued patent. Furthermore, all patents, test procedures, and other documents cited in this application are fully incorporated by reference to the extent such disclosure can be not inconsistent with this application and for all jurisdictions in which such incorporation can be permitted.

While certain preferred embodiments of the present invention have been illustrated and described in detail above, it can be apparent that modifications and adaptations thereof will occur to those having ordinary skill in the art. It should be, therefore, expressly understood that such modifications and adaptations may be devised without departing from the basic scope thereof, and the scope thereof can be determined by the claims that follow.

What is claimed is:

1. A process for locating an emission detecting camera at a worksite, the process comprising:
   creating a site model, comprising:
      building a three-dimensional (3D) model of the worksite;
      identifying a plurality of potential emission source locations within the 3D model of the worksite; and
      identifying a plurality of potential camera locations within the 3D model of the worksite;
   completing a camera coverage calculation loop, comprising:
      choosing a first camera location from the plurality of potential camera locations;
      adding a simulated camera at the first camera location within the 3D model and a simulated field of view of the simulated camera;
      completing a source calculation loop for the simulated camera, the source calculation loop comprising:
         (i) choosing an emission source location from the plurality of the potential emission source locations to provide a first simulated emission source location within the 3D model;
         (ii) automatically calculating a coverage value of the simulated camera at the first camera location for the emission source location using the 3D model, wherein automatically calculating the coverage value includes determining, using the 3D model, whether, at the first camera location: (1) the simulated camera has an unobstructed line-of-sight (LOS) to the first simulated emission source location within the 3D model and (2) the first simulated emission source location is within a range of the simulated camera;
(iii) repeating steps (i) and (ii) until all of the plurality of potential emission source locations have been chosen and coverage values of the first camera location for all of the plurality of potential emission source locations have been calculated to provide a plurality of coverage values; and
(iv) calculating a coverage ratio from the plurality of coverage values from the source calculation loop for the first camera location to provide a first coverage ratio, wherein calculating the coverage ratio includes comparing (1) a number of the plurality of potential emission source locations at which the simulated camera, at the first camera location, both has an unobstructed LOS to the emission source location and at which the emission source location is within the range of the simulated camera to (2) a number of the plurality of potential emission source locations at which the simulated camera, at the first camera location, has at least one of: an obstructed LOS to the emission source location or at which the emission source location is outside the range of the simulated camera; and
repeating the camera coverage calculation loop for at least one additional potential camera location of the plurality of potential camera locations to provide a plurality of coverage ratios;
creating an ordered list of the plurality of potential camera locations based on the plurality of coverage ratios; and
choosing a camera position at the worksite from the ordered list, wherein the emission detecting camera is installed at the chosen camera position at the worksite.

2. The process of claim 1, wherein the emission detecting camera is a light detection and ranging (LiDAR) camera.

3. The process of claim 1, wherein creating the ordered list further comprises calculating a list of union values of two or more coverage ratios corresponding to two or more potential camera locations.

4. The process of claim 1, wherein calculating the coverage ratio further comprises weighting one or more of the plurality of potential emission source locations to increase a coverage value associated with the one or more weighted potential emission source locations.

5. The process of claim 1, wherein choosing the camera position at the worksite comprising choosing the camera position from the ordered list that has a greatest coverage ratio of the plurality of coverage ratios.

6. The process of claim 1, wherein:
the emission detecting camera is a light detection and ranging (LiDAR) camera;
creating the ordered list further comprises calculating a list of union values of two or more coverage ratios corresponding to two or more potential camera locations;
calculating the coverage ratio further comprises automatically weighting one or more of the plurality of potential emission source locations to increase a coverage value associated with the one or more weighted potential emission source locations, wherein the automatic weighting is based on a type of the plurality of potential emission source locations; and
choosing the camera position at the worksite comprising choosing the camera position from the ordered list that has a greatest coverage ratio of the plurality of coverage ratios.

7. A process for locating an emission detecting camera at a worksite, the process comprising:
creating a site model, creating the site model comprising:
building a three-dimensional (3D) model of the worksite;
identifying a plurality of potential emission source locations within the 3D model of the worksite;
identifying a plurality of emission source location cost values; and
identifying a plurality of potential camera locations within the 3D model of the worksite;
calculating a plurality of loss values using the plurality of emission source location cost values and the plurality of potential camera locations;
creating a location list based on a cost function and the plurality of loss values;
completing a camera coverage calculation loop, comprising:
choosing a first camera location from the location list;
adding a simulated camera at the first camera location within the 3D model and a simulated field of view of the simulated camera;
completing a source calculation loop, the source calculation loop comprising:
(i) choosing an emission source location from the plurality of the potential emission source locations to provide a first simulated emission source location within the 3D model;
(ii) automatically calculating a coverage value of the simulated camera at the first camera location for the emission source location using the 3D model, wherein automatically calculating the coverage value includes determining, using the 3D model, whether, at the first camera location: (1) the simulated camera has an unobstructed line-of-sight (LOS) to the first simulated emission source location within the 3D model and (2) the first simulated emission source location is within a range of the simulated camera;
(iii) repeating steps (i) and (ii) until all of the plurality of potential emission source locations have been chosen and coverage values of the first camera location for all of the plurality of potential emission source locations have been calculated to provide a plurality of coverage values; and
(iv) calculating a coverage ratio from the plurality of coverage values from the source calculation loop for the first camera location to provide a first coverage ratio, wherein calculating the coverage ratio includes comparing (1) a number of the plurality of potential emission source locations at which the simulated camera, at the first camera location, both has an unobstructed LOS to the emission source location and at which the emission source location is within the range of the simulated camera to (2) a number of the plurality of potential emission source locations at which the simulated camera, at the first camera location, has at least one of: an obstructed LOS to the emission source location or at which the emission source location is outside the range of the simulated camera; and repeating the camera coverage calculation loop for at least one additional potential camera location from the location list to provide a plurality of coverage ratios;

creating an ordered list of the plurality of potential camera locations based on the plurality of coverage ratios; and choosing a camera position at the worksite from the ordered list, wherein the emission detecting camera is installed at the chosen camera position at the worksite.

8. The process of claim 7, wherein the emission detecting camera is a light detection and ranging (LiDAR) camera.

9. The process of claim 7, wherein creating the ordered list further comprises calculating a list of union values of two or more coverage ratios corresponding to two or more potential camera locations.

10. The process of claim 7, wherein calculating the coverage ratio further comprises weighting one or more of the plurality of potential emission source locations to increase a coverage value associated with the one or more weighted potential emission source locations.

11. The process of claim 7, wherein choosing the camera position at the worksite comprising choosing the camera position from the ordered list that has a greatest coverage ratio of the plurality of coverage ratios.

12. The process of claim 7, wherein the cost function utilizes a least-squares regression.

13. The process of claim 7, wherein the cost function utilizes a steepest-descent model.

14. A process for locating an emission detecting camera at a worksite, the process comprising:

creating a site model, comprising:
building a three-dimensional (3D) model of the worksite;
identifying a plurality of potential emission source locations within the 3D model of the worksite; and
identifying a plurality of potential camera locations within the 3D model of the worksite;

completing an emission coverage calculation loop, comprising:
choosing a first emission source location from the plurality of potential emission source locations;
completing a camera calculation loop, the camera calculation loop comprising:
(i) choosing a camera location from the plurality of the potential camera locations to provide a first camera location;
(ii) adding a simulated camera at the first camera location within the 3D model and a simulated field of view of the simulated camera;
(iii) automatically calculating a coverage value of the simulated camera at the first camera location for the first emission source location using the 3D model, wherein automatically calculating the coverage value includes determining, using the 3D model, whether, at the first camera location: (1) the simulated camera has an unobstructed line-of-sight (LOS) to the first emission source location within the 3D model and (2) the first simulated emission source is within a range of the simulated camera; and (iv) repeating steps (i)-(iii) until all of the plurality of potential camera locations have been chosen and coverage values of the first emission source location for all of the plurality of potential camera locations have been calculated to provide a plurality of coverage values; and (v) calculating a coverage ratio from the plurality of coverage values for the first emission source location to provide a first coverage ratio, wherein calculating the coverage ratio includes comparing (1) a number of the plurality of potential emission source locations at which the simulated camera, at the first camera location, both has an unobstructed LOS to the emission source location and at which the emission source location is within the range of the simulated camera to (2) a number of the plurality of potential emission source locations at which the simulated camera, at the first camera location, has at least one of: an obstructed LOS to the emission source location or at which the emission source location is outside the range of the simulated camera; and repeating the emission coverage calculation loop for at least one additional potential emission source location of the plurality of potential emission source locations to provide a plurality of coverage ratios;

creating an ordered list of the potential camera locations based on the plurality of coverage ratios; and choosing a camera position at the worksite from the ordered list, wherein the emission detecting camera is installed at the chosen camera position at the worksite.

15. The process of claim 14, wherein the emission detecting camera is a light detection and ranging (LiDAR) camera.

16. The process of claim 14, wherein creating the ordered list further comprises calculating a list of union values of two or more coverage ratios corresponding to two or more potential camera locations.

17. The process of claim 14, wherein calculating the coverage ratio further comprises weighting one or more of the plurality of potential emission source locations to increase a coverage value associated with the one or more weighted potential emission source locations.

18. The process of claim 14, wherein choosing the camera position at the worksite comprising choosing the camera position from the ordered list that has a greatest coverage ratio of the plurality of coverage ratios.

* * * * *